United States Patent [19]

Baba

[11] 4,236,421
[45] Dec. 2, 1980

[54] MESHING MECHANISM FOR INTERMITTENT TRANSMISSION

[75] Inventor: Masanao Baba, Takarazuka, Japan

[73] Assignee: Nippon Cable System, Inc., Hyogo, Japan

[21] Appl. No.: 952,448

[22] Filed: Oct. 18, 1978

[30] Foreign Application Priority Data

Apr. 8, 1978 [JP] Japan ................. 53-46474

[51] Int. Cl.$^2$ ................. F16H 57/04; F16N 7/12
[52] U.S. Cl. ................. 74/467; 184/102; 74/436
[58] Field of Search ............ 74/467, 468, 99 R, 109; 184/102, 13 R, 15 R; 418/90

[56] References Cited

U.S. PATENT DOCUMENTS

| | | | |
|---|---|---|---|
| 1,502,083 | 7/1924 | Zoelly | 74/468 |
| 1,757,539 | 5/1930 | Minor | 184/15 R |
| 2,492,213 | 12/1949 | Eder et al. | 74/99 X |
| 2,867,130 | 1/1959 | Moeller | 74/467 |
| 3,001,741 | 9/1961 | Rumsey | 74/99 R |
| 3,339,670 | 9/1967 | McGrew, Jr. et al. | 418/90 X |

Primary Examiner—Leslie Braun
Assistant Examiner—Conrad Berman
Attorney, Agent, or Firm—Armstrong, Nikaido, Marmelstein & Kubovcik

[57] ABSTRACT

In an intermittent transmission meshing mechanism comprising a toothed drive member having a toothed portion and a circular outer periphery continuous therewith and a toothed driven member having a toothed portion and arcuate locking faces formed on the opposite sides thereof, an oil retaining member having a projection projecting toward the drive member is provided on the driven member between the toothed portion thereof and each of the locking faces or on each of the locking faces. When an end of the circular outer periphery of the drive member adjacent its toothed portion comes into sliding contact with the toothed portion or locking face of the driven member, the corresponding oil retaining member slightly presses against and applies lubricant to the end. The oil retaining member affords continued lubrication over a prolonged period of time without the depletion of lubricant liable to occur in conventional like meshing mechanisms and without entailing any waste of lubricant since no lubrication is done while the mechanism is out of operation. The oil retaining member can be easily replenished with lubricant.

3 Claims, 7 Drawing Figures

MESHING MECHANISM FOR INTERMITTENT TRANSMISSION

BACKGROUND OF THE INVENTION

The present invention relates to a novel meshing mechanism for intermittent transmission which is prevented from depletion of lubricant.

Intermittent transmission meshing mechanisms heretofore known have the drawback that the parts, even when fully lubricated prior to the start of operation, are depleted of the lubricant during a long period of time and encounter increased frictional resistance which causes rapid wear and consequently renders the mechanism no longer operative as desired.

In systems in which the intermittent transmission meshing mechanism is used, for example, in a remote control system for a marine engine, the inner wire of a control cable coupled to the clutch of the marine engine is connected to one end of a toothed driven member of the mechanism so that the clutch can be operated by the movement of the driven member. When the clutch is operated by the movement of the driven member, the inner wire, which is flexible, backlashes within a flexible tube slidably sheathing the inner wire due to bending, deformation or like cause under a pushing load. Accordingly the driven member of the transmission mechanism must be moved excessively by an amount corresponding to the backlash. At this time, the pressure on the inner wire forces a tooth of the driven member toothed portion into sliding contact, at part of its outer periphery, with the circular outer periphery of a drive member. If the contact portion should then be depleted of lubricant, the lever fixed to the shaft of the drive member is not smoothly turnable, while the outer periphery of the tooth will wear away rapidly, with the result that the driven member is returned in the direction in which the lever is reversely turned. If the lever is turned repeatedly under such a condition, the clutch becomes no longer fully engageable and an engine trouble will develop.

OBJECTS OF THE INVENTION

An object of the present invention to provide a meshing mechanism for intermittent transmission in which a toothed drive member and a toothed driven member are prevented from depletion of lubricant where they slide on each other to minimize the resulting wear.

Another object of the invention is to provide a meshing mechanism for intermittent transmission prevented from depletion of lubricant in which the drive member and the driven member can be prevented from wearing over a prolonged period of time.

Still another object of the invention is to provide a meshing mechanism, for example, for use in a remote control system for marine engines which is operative free of the objectionable wear that would usually result when the outer periphery of a tooth of the driven member toothed portion is forced into contact at part of its outer periphery with the circular outer periphery of the driven member to thereby render the marine engine operative free of malfunction.

Other objects of the invention will become apparent from the following description given with reference to the accompanying drawings.

DETAILED DESCRIPTION

The present invention provides an intermittent transmission meshing mechanism prevented from depletion of lubricant comprising a toothed drive member rotatably mounted on a casing and a toothed driven member to be intermittently driven by the rotation of the drive member, the drive member having a toothed portion and a circular outer periphery continuous with the toothed portion, the driven member having a toothed portion meshable with the drive member toothed portion and an arcuate locking face formed on at least one side of and substantially continuous with the driven member toothed portion, the meshing mechanism being characterized in that an oil retaining member having a projection projecting toward the driven member is provided on the driven member between the toothed portion thereof and the locking face or on the locking face, so that when an end of the circular outer periphery of the drive member adjacent its toothed portion or the locking face of the driven member, the oil retaining member slightly presses against and applies lubricant to the end.

With reference to the accompanying drawings, a marine engine control unit will be described below which incorporates a meshing mechanism prevented from depletion of lubricant and embodying the invention.

Figure 1:
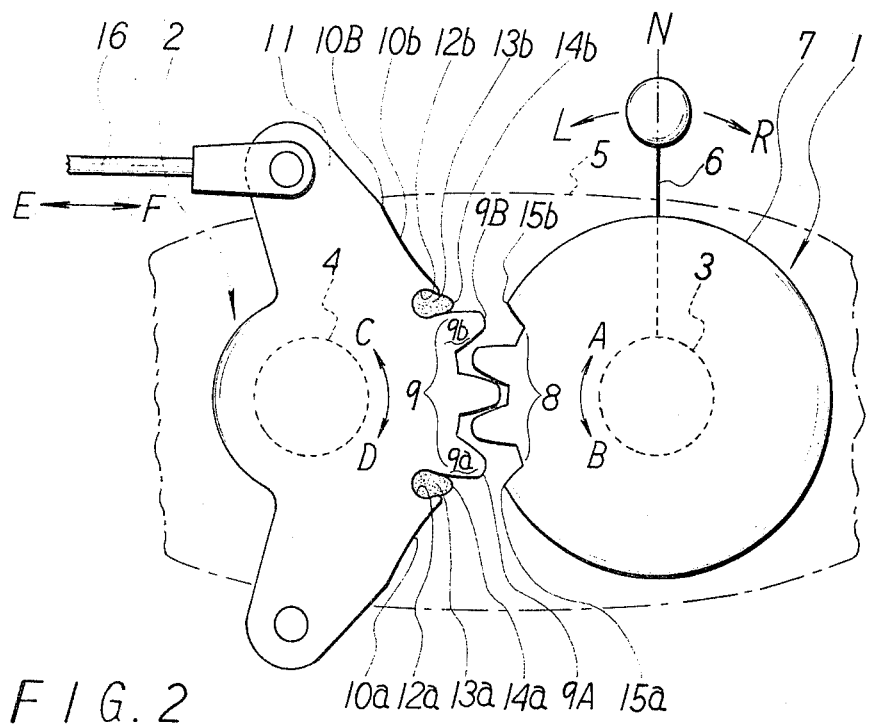
FIG. 1 is a schematic front view showing the main part of a marine engine control unit incorporating an intermittent transmission meshing mechanism in which depletion of lubricant is prevented and which embodies the invention.
Figure 2:
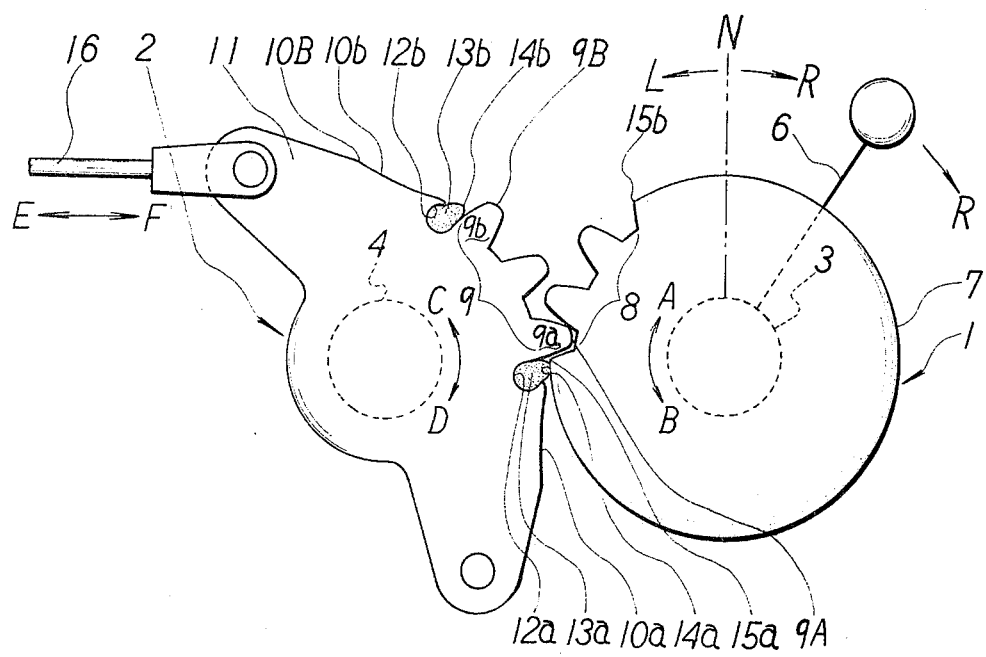
FIG. 2 is a front view showing the embodiment of FIG. 1 with a lever 6 turned from neutral position N in the direction R.
Figure 3:
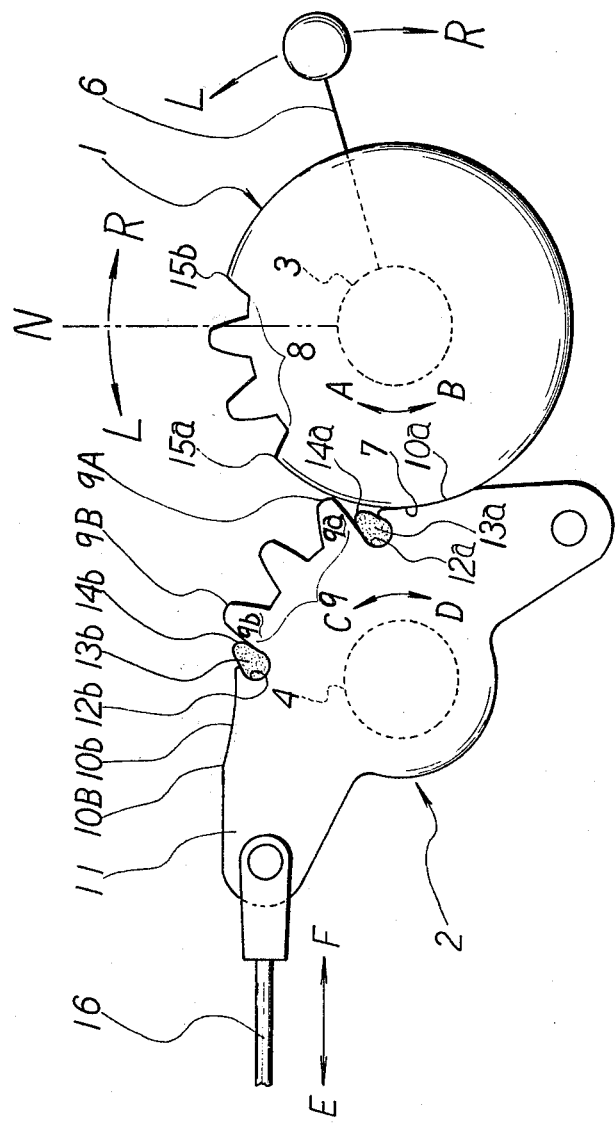
FIG. 3 is a front view showing the embodiment of FIG. 1 with the lever 6 further turned from the position in FIG. 2 in the direction R.

FIGS. 1 to 3 show a toothed drive member 1 rotatably supported by a shaft 3 on a casing 5, and a toothed driven member 2 rotatably mounted by a shaft 4 on the casing 5. The drive member 1 has a toothed portion 8 and a circular outer periphery 7 continuous with the toothed portion 8 and is turnable in a direction A or B by a lever 6 attached to the shaft 3. The driven member 2 has a toothed portion 9 meshable with the toothed portion 8 of the drive member 1 and two arcuate locking faces 10a and 10b formed on the opposite sides of the toothed portion 9 and substantially continuous therewith. Oil retaining members 13a and 13b are inserted in recesses 12a and 12b formed between teeth 9a, 9b at the opposite ends of the toothed portion 9 and the arcuate locking faces 10a, 10b respectively. The oil retaining members can be made from oil-impregnatable flexible or elastic material. Examples of useful materials are natural fibers as wool, synthetic fibers such as asbestos fiber, stainless steel fiber, glass wool and polyvinyl alcohol fiber, and porous materials of synthetic resin.

The driven member 2 has an arm 11 close to an end 10B of the arcuate locking face 10b. The inner wire 16 of a control cable (hereinafter referred to briefly as "cable") connected at its one end to the clutch (not shown) of the marine engine is secured pivotally at the other end thereof to the arm 11.

As shown in FIGS. 2, 3, 5 and 6, the arcuate locking faces 10a and 10b are adapted to come into sliding contact with the circular outer periphery 7 of the drive member 1 when the driven member 2 has been turned through a specified angle by the drive member 1, thus preventing the turn of the driven member 2. The oil retaining members 13a and 13b have projections 14a and 14b adapted to lubricate the opposite ends 15a and 15b of the circular outer periphery 7 in slight pressing contact therewith during the turn of the driven member 2.

Figure 6:
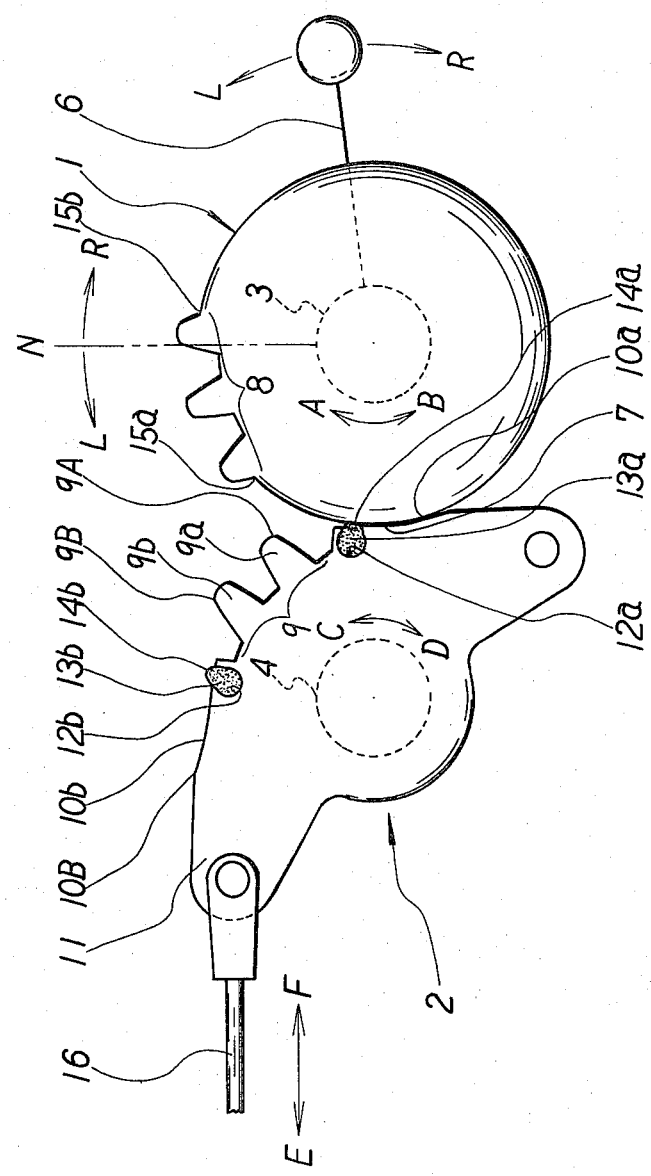
FIG. 6 is a front view showing the embodiment of FIG. 4 with its lever 6 further turned from the position in FIG. 5 in the direction R.

The operation and advantages of the foregoing embodiment will be described below with reference to FIGS. 1 to 6. When the lever 6 is turned from the neutral position N in a direction R to turn the drive member 1 in the direction A in FIGS. 2 and 5, the toothed portion 8 meshing with the toothed portion 9 turns the driven member 2 in the direction C, pushing the inner wire 16 in a direction E to change over the engine clutch for example to a forward position. At this time, one end 15a of the circular outer periphery 7 of the drive member 1 comes into slight pressing contact with the projection 14a of the oil retaining member 13a, which in turn applies a small amount of lubricant to the end 15a. With a further turn of the lever 6 in the direction R, the end 15a comes into sliding contact with and lubricates the outer periphery 9A of the tooth 9a of the toothed portion 9. When the lever 6 is still further turned in the direction R as seen in FIGS. 3 and 6, part of the outer periphery 9A of the tooth 9a comes into sliding contact with and lubricates the circular outer periphery 7 of the drive member 1. Since the circular outer periphery 7 is now in sliding contact with the arcuate locking face 10a of the driven member 2 or with the locking face 10a and the tooth 9a (hereinafter referred to merely as "locking face 10a, etc."), the driven member 2 is locked against rotation, whereby the clutch is held in its forward position.

When the lever 6 is further turned in the direction R, a throttle control cable (not shown) adapted to be operated directly or indirectly by the drive member 1 advances the throttle of the engine (not shown), propelling the boat forward at a progressively increasing speed.

When the lever 6 is turned backward in a direction L from the position of FIGS. 3 and 6 toward the neutral position N, the throttle range reduces and the clutch subsequently returns to the neutral position. At this time, the lubricant applied to the circular outer periphery 7 reduces the sliding resistance between the periphery and the locking face 10a, etc., hence reduced wear. Since the oil retaining member 13a contacts the end 15a of the outer periphery 7 only, the consumption of the lubricant due to the rotation of the drive member and of the driven member can be reduced to a minimum required. This ensures lubrication for a prolonged period of time.

Figure 4:
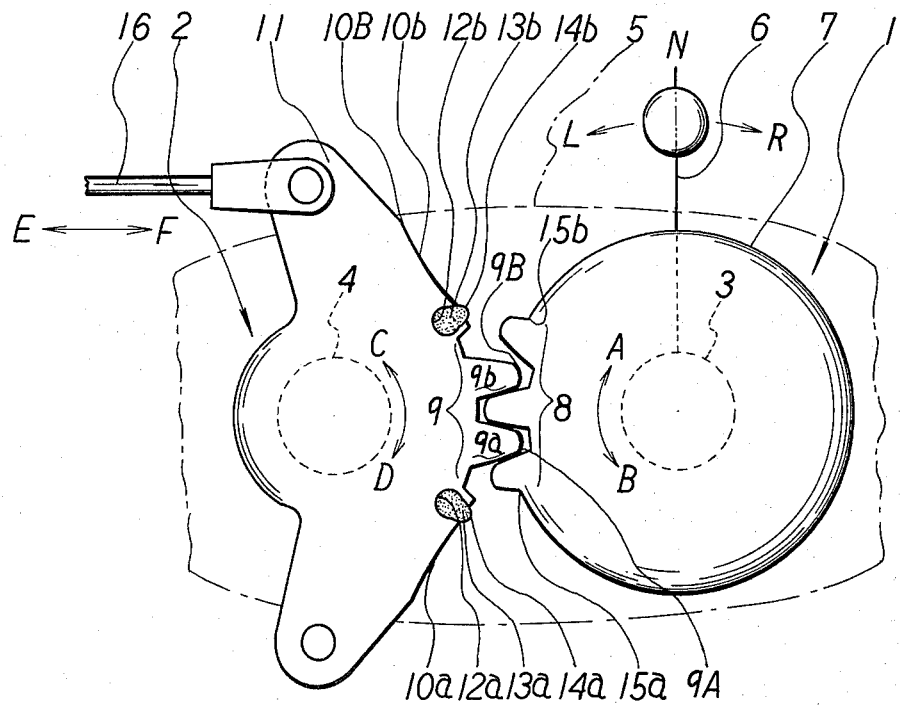
FIG. 4 is a schematic front view showing another embodiment of the invention.
Figure 5:
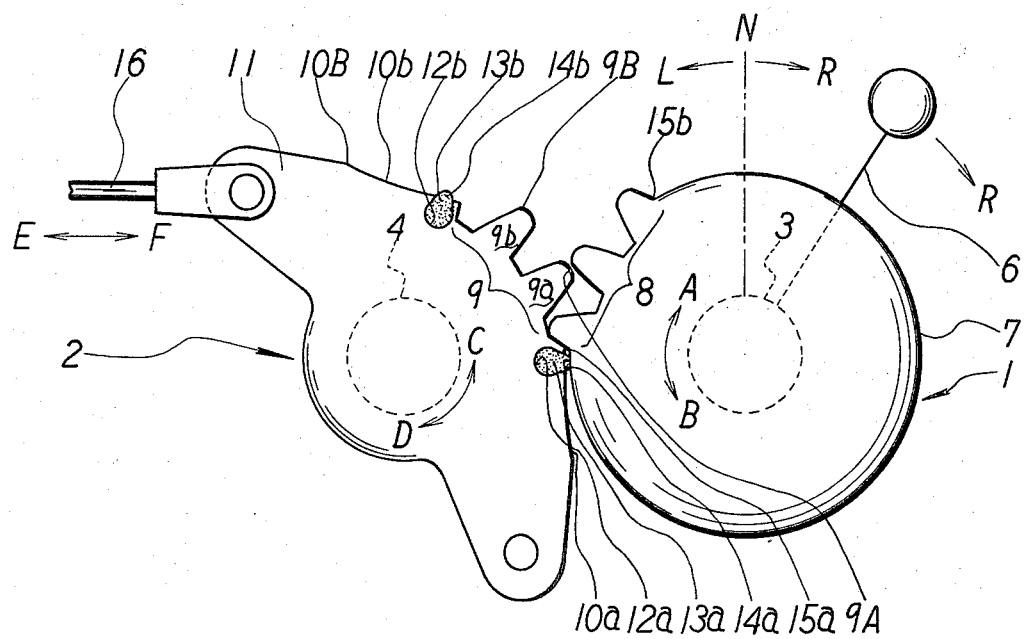
FIG. 5 is a front view showing the embodiment of FIG. 4 with its lever 6 turned from neutral position N in the direction R.

When the lever 6 in FIGS. 1 and 4 is turned from the neutral position N in the direction L, the drive member 1 rotates in the direction B, rotating the driven member 2 in the direction D and bringing the end 15b of the circular outer periphery 7 to come into contact with the projection 14b of the oil retaining member 13b beside the tooth 9b of the toothed portion 9. The small amount of lubricant applied to the end 15b is transferred onto the periphery 9B of the tooth 9b and further onto the circular outer periphery 7 with the rotation of the drive member 1 in the direction B. Thus as is the case with the turn of the lever 6 in the direction R, the lubricant reduces the sliding resistance between the drive member and the driven member and serves to reduce the wear involved.

With the present embodiment, the clutch is operated by the turn of the driven member 2 as already stated. At this time, the inner wire of the cable, which is flexible, backlashes within the flexible tube of the cable slidably sheathing the inner wire by being deformed to a zigzag shape by bending or for some other cause under a pushing load. Accordingly the driven member 2 must be moved excessively by an amount corresponding to the backlash. Consequently, while the locking face 10a or 10b is in sliding contact with the circular outer periphery 7 for example as shown in FIGS. 3 and 6, the pressure of the inner wire 16 in a direction F acts on the driven member 2, forcing part of the outer periphery 9A of the tooth 9a into sliding contact with the circular outer periphery 7. If the contact portion should then be depleted of the lubricant, the lever 6 will not be smoothly turnable, while the outer periphery 9A would wear away rapidly, permitting the driven member to return in the direction D by the corresponding amount. As a result, the lever 6, when thereafter turned in the direction R, will cause a reduced movement of the inner wire 16 in the direction E, failing to fully engage the clutch and giving rise to an engine trouble. According to the present invention, however, the oil retaining member continuously applies the lubricant in small amounts over a prolonged period, whereas waste of the lubricant will not result since no lubrication is made while the meshing mechanism is out of operation. Additionally it is easy to replenish the oil retaining member with oil.

Although the oil retaining members 13a and 13b in the foregoing embodiment are adapted to contact only the ends 15a and 15b of the circular outer periphery 7, each oil retaining member may be provided at a suitable portion of the arcuate locking face of the driven member 2 also for pressing contact with the periphery 7 when increased lubrication is desirable at all times.

The number of the teeth in each of the drive member toothed portion 8 and the driven member toothed portion 9 is not limited to that illustrated and described.

Figure 7:
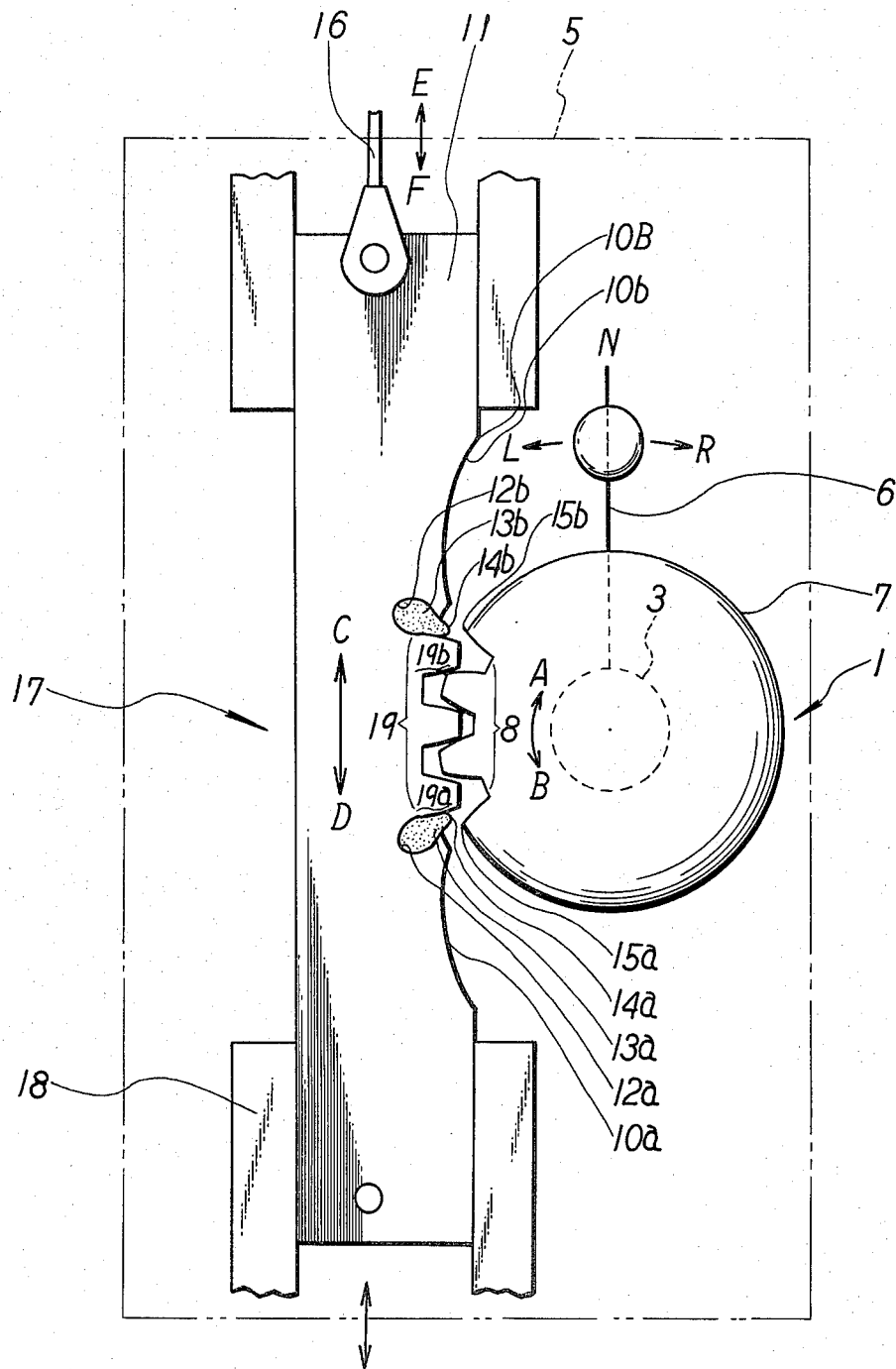
FIG. 7 is a schematic front view showing still another embodiment of the invention.

Although the driven member 2 is rotatably mounted on the casing 5 in the embodiments of FIGS. 1 to 6, the toothed driven member 17 shown in FIG. 7 is also useful which is slidable along a guide 18 and having a toothed portion in the form of a rack 19.

What is claimed is:

1. An intermittent transmission meshing mechanism prevented from depletion of lubricant comprising a toothed drive member rotatably mounted on a casing; a toothed driven member to be intermittently driven by the rotation of said drive member, said drive member having a toothed portion and a circular outer periphery continuous with the toothed portion, said driven member having a toothed portion meshable with said drive member toothed portion and an arcuate locking face formed on at least one side of and substantially continuous with said driven member toothed portion; and an oil retaining member on said driven member between the toothed portion thereof and the locking face or on the locking face, said oil retaining member having a projection projecting toward said drive member, so that when an end of the circular outer periphery of said drive member adjacent its toothed portion comes into sliding contact with the toothed portion or the locking face of said driven member, said oil retaining member slightly presses against and applies lubricant to the end.

2. The intermittent transmission meshing mechansim as defined in claim 1 wherein said oil retaining member is made from oil-impregnatable and flexible fibers.

3. The intermittent transmission meshing mechanism as defined in claim 1 wherein said oil retaining member is made from a porous material of synthetic resin.

* * * * *